(12) United States Patent
Drenski et al.

(10) Patent No.: US 9,736,075 B2
(45) Date of Patent: *Aug. 15, 2017

(54) METHOD FOR GENERATING A LOAD SHARING VECTOR

(71) Applicant: Telefonaktiebolaget L M Ericsson (publ), Stockholm (SE)

(72) Inventors: Bernardin Drenski, Zagreb (HR); Jürgen Sauermann, Aachen (DE); Jan Scheurich, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/788,981

(22) Filed: Jul. 1, 2015

(65) Prior Publication Data

US 2015/0304221 A1 Oct. 22, 2015

Related U.S. Application Data

(63) Continuation of application No. 13/640,339, filed as application No. PCT/EP2010/055123 on Apr. 19, 2010, now Pat. No. 9,118,504.

(51) Int. Cl.
*H04L 1/00* (2006.01)
*H04L 12/803* (2013.01)
(Continued)

(52) U.S. Cl.
CPC .......... *H04L 47/125* (2013.01); *H04L 12/56* (2013.01); *H04L 12/66* (2013.01); *H04L 45/00* (2013.01); *H04L 45/24* (2013.01); *H04L 45/44* (2013.01)

(58) Field of Classification Search
CPC ......... H04L 65/00; H04L 45/00; H04L 45/02; H04L 45/04; H04L 45/54; H04L 49/3009;
(Continued)

(56) References Cited

U.S. PATENT DOCUMENTS 6,069,894 A 5/2000 Holender et al.
6,266,531 B1 * 7/2001 Zadeh ................... H04W 16/06
455/436

(Continued)

OTHER PUBLICATIONS

Morneault et al., "Signaling System 7 (SS7) Message Transfer Part 3 (MTP3) User Adaption Layer (M3UA)", Memo, The Internet Society, retrieved from the internet: http://www.ietf.org/rfc/rfc4666.txt [retrieved on Jan. 8, 2015]; Sep. 2006, pp. 1-114.

(Continued)

*Primary Examiner* — Brenda H Pham
(74) *Attorney, Agent, or Firm* — Coats & Bennett, PLLC

(57) ABSTRACT

The invention relates to a method for generating a load sharing vector indicating a plurality of communication targets for load sharing in a communication network. The method comprises providing a target distribution vector comprising a first number of entries indicating a first communication target, and comprising a second number of entries indicating a second communication target, and generating the load sharing vector upon the basis of active entries of the target distribution vector, the active entries indicating the communication target of the first or the second communication target which is available for load sharing in the communication network.

19 Claims, 11 Drawing Sheets

(51) Int. Cl.
*H04L 12/701* (2013.01)
*H04L 12/707* (2013.01)
*H04L 12/54* (2013.01)
*H04L 12/66* (2006.01)
*H04L 12/721* (2013.01)

(58) Field of Classification Search
CPC .............. H04L 12/5601; H04L 49/309; H04L 47/6225; H04L 2012/5679; H04L 47/50; H04L 47/623; H04L 47/10; H04L 47/125; H04L 45/24; H04L 12/56; H04L 12/66; H04L 45/44; H04L 47/35; H04L 47/30; H04L 47/32; H04L 43/50; H04L 43/0852; H04W 24/00; H04B 43/50; H04B 43/0852
USPC ......... 370/351, 395.31, 395.41, 395.43, 231, 370/235, 235.1, 229
See application file for complete search history.

(56) References Cited

U.S. PATENT DOCUMENTS

| | | | |
|---|---|---|---|
| 6,510,735 B2 * | 1/2003 | Igarashi | F02D 41/187 73/204.22 |
| 6,697,333 B1 * | 2/2004 | Bawa | H04L 45/10 370/238 |
| 6,768,718 B1 | 7/2004 | Beshai et al. | |
| 8,203,954 B1 * | 6/2012 | Patel | H04L 45/00 370/235 |
| 8,553,537 B2 * | 10/2013 | Chao | H04L 12/66 370/229 |
| 9,118,504 B2 * | 8/2015 | Drenski | H04L 45/00 |
| 2002/0105915 A1 | 8/2002 | Hamada | |
| 2006/0250964 A1 * | 11/2006 | Vasseur | H04L 45/10 370/238 |
| 2007/0053300 A1 * | 3/2007 | Zhu | H04L 45/12 370/238 |
| 2008/0114892 A1 | 5/2008 | Bruno et al. | |

OTHER PUBLICATIONS

Tu-T Telecommunication Standardization Sector of ITU, "Signalling network functions and messages", Series Q: Switching and Signalling Specifications of Signalling System No. 7—Message transfer part, ITU-T Recommendation Q.704, Jul. 1996, pp. 1-205.

* cited by examiner

METHOD FOR GENERATING A LOAD SHARING VECTOR

RELATED APPLICATIONS

This application is a continuation of U.S. application Ser. No. 13/640,339, filed 19 Dec. 2012, which was the National Stage of International Application No. PCT/EP2010/055123, filed 19 Apr. 2010, the disclosures of each of which are incorporated herein by reference in their entirety.

TECHNICAL FIELD

The present invention pertains to load sharing in communication networks.

BACKGROUND

In modern communication systems, load sharing has become an important role for efficiently distributing traffic in a communication network among multiple routes or towards different nodes which may handle the same application with different processing capacities. Load sharing approaches directed to distributing traffic to different receiving network nodes are based on the assumption that a communication node is capable of distributing traffic among the receiving network nodes according to their processing capacity which results in a capacity-weighted load sharing. An example of such a load sharing approach is the M3UA (Message Transfer Part Level 3 User Adaptation Layer) signaling gateway process (SGP) which distributes traffic to an M3UA application server (AS) in a load sharing mode. Conversely, load sharing approaches which are based on traffic distribution among different paths assume that a distributing communication node forwards messages to a single receiving network node through a number of alternative signaling routes or paths which are respectively associated with a capacity. An example of such a load sharing approach may be the M3UA ASP connecting to a remote SS7 (Signaling System No. 7) signaling end point (SEP) through a number of M3UA SGPs.

According to conventional load sharing approaches, the messages belonging to the same message flow may be forwarded to the same receiving network node over the same route. In the case of connection-oriented transport protocols such as SUA or TCP, forwarding may achieved by means of connection-awareness of the distributing communication node, which results in a stateful distribution. In some cases, the identity of the receiving network node terminating the connection may be encoded in some transport protocol parameter so that the distributor may forward all subsequent messages directly to the proper receiving network node without having to maintain a connection state, which results in a stateless distribution.

For connection-less transport protocols, however, a message flow may be not uniquely identifiable by means of protocol parameters directly visible to distributing, i.e. load sharing, communication node such as M3UA. In this case, packet inspection may be necessary on the communication node to determine the message flow and select the proper recipient node or route.

In SS7 and SIGTRAN (M3UA) networks, the SLS (Signaling Link Selection) parameter may be used for load sharing messages flows among in several ways. The M3UA SGP may e.g. load share message flows among the ASPs in an AS in order to ensure that all messages in the flow are transmitted to the same ASP. The SEP, ASP, STP or SGP may load share message flows among routes/links towards a given destination in order to keep an in-sequence delivery to the destination. For these purposes, the application layer may provide an SLS value with every message to be sent. The same SLS value may be used for all messages pertaining to a specific signaling transaction, e.g. a call in case of ISUP, or a TCAP transaction, which may require in-sequence delivery. The SLS parameter may be included in the MTP/M3UA header and used for load sharing in every hop along the signaling route.

However, according e.g. to the ITU-T (ETSI) standard, the SLS is only a four bit parameter, which means it may not be used for load sharing among more than 16 ASPs or routes. Another problem may arise with respect to re-routing. When an ASP activates itself on SGP, or if a route becomes available, then a controlled re-routing may be started. Therefore, the complete traffic is stored in a controlled re-routing buffer until a timer expires. The re-distribution of SLS values to available ASPs or routes, the so-called change of load sharing pattern, is an implementation issue and may not efficiently maintaining capacity weights and minimizing re-routing complexity.

SUMMARY

The invention is based on the finding that an efficient load sharing concept may be achieved when, e.g. preliminarily, communication targets which are available for load sharing in a communication network are determined. In this regard, the term "communication target" may refer to a communication route or to a communication path or to a network node.

According to an aspect, the invention relates to a method for generating a load sharing vector indicating a plurality of communication targets for load sharing in a communication network. The method comprises providing a target distribution vector comprising a first number of entries indicating a first communication target, and comprising a second number of entries indicating a second communication target, and generating the load sharing vector upon the basis of active entries of the target distribution vector, the active entries indicating the communication target of the first or the second communication target which is available for load sharing in the communication network.

The target distribution vector may form a basis for generating the load sharing vector. According to some implementations, the entries of the load sharing vector may be cached which realizes a cache sharing vector forming an embodiment of the load sharing vector. In particular, the load sharing vector itself may form a cache for the available targets in the target distribution vector. In order to determine whether the respective communication target is available for load sharing in the communication network, e.g. signaling messages may be communicated.

The target distribution vector and/or the load sharing vector may be realized using memory arrays, wherein the respective entries may be stored as digital values in respective memory cells of the memory arrays, e.g. registers. Thus, the term "entry" may refer to a content of a memory cell of a memory array realizing the target distribution vector or the load sharing vector.

According to an embodiment, the target distribution vector comprises a plurality of entries, wherein the step of providing the target distribution vector comprises determining the first number of entries, and/or determining the second number of entries. By way of example, the respective number of entries may depend on a capacity of the respective communication target or to any measure indicating the respective capacity of the respective communication target. In order to normalize the distribution of the entries associated with the respective communication target, the respective capacities may be normalized, e.g. related to a total capacity of all communication targets of the target distribution vector.

According to an embodiment, a ratio of the first number of entries and the second number of entries corresponds to a ratio of a capacity of the first communication target and a capacity of the second communication target. Thus, the number of entries associated with e.g. the first communication target directly represents the capacity of the first communication target in the target distribution vector. The same applies to the second communication target.

According to an embodiment, the step of providing the target distribution vector comprises determining the first number of entries and the second number of entries upon the basis of the following formula:

$$\frac{wi \cdot M}{w_{tot}},$$

wherein wi denotes a capacity of the i-th communication target, wherein M denotes a total number of entries in the target distribution vector, and wherein $w_{tot}$ denotes a capacity of all communication targets indicated in the target distribution vector.

According to an embodiment, the step of providing the target distribution vector comprises randomly reordering entries in the target distribution vector. By randomly reordering the entries in the target distribution vector, a degrouping of possibly grouped entries associated with the same communication target may be achieved. Thus, the reordering may be performed entry-wise. Alternatively, entries may randomly be inserted into the target distribution vector to obtain a randomized target distribution vector.

According to an embodiment, the step of generating the load sharing vector comprises scanning the target distribution vector for entries associated with communication targets which are available for load sharing. In order to scan the target distribution vector, a search for entries associated with communication targets which are available for node sharing may be performed.

According to an embodiment, the step of generating the load sharing vector comprises copying the entries indicating communication targets which are available for load sharing from the target distribution vector into the load sharing vector. In order to copy the entries indicating the available communication targets, a write operation with respect to memory cells of a memory array may be performed.

According to an embodiment, the step of generating the load sharing vector comprises entry-wise comparing entries of the load sharing vector with entries of the target distribution vector, and updating entries of the load sharing vector with entries of the target distribution vector which are associated with communication targets being available for load sharing to obtain the active entries in the load sharing vector. In this regard, e.g. preliminary random reordering of entries of the target distribution vector may be performed in order to avoid subsequent comparisons of entries associated with the same communication target.

According to an embodiment, the step of generating the load sharing vector comprises comparing an entry of the load sharing vector with an entry of the target distribution vector, if the entry of the target distribution vector indicates a communication target which is available for load sharing, and if the entry of the target distribution vector differs from the entry of the load sharing vector, replacing the entry of the load sharing vector by the entry of the target distribution vector to obtain an active entry in the load sharing vector, and/or if the entry of the target distribution vector indicates a communication target which is not available for load sharing, comparing the entry of load sharing vector with a further entry, in particular with a subsequent entry, of the target distribution vector. Thus, subsequent entries of the target distribution vector may be scanned with e.g. wrapping for the first available target and copy that into the current load sharing vector entry.

According to a further aspect, the invention relates to a method for load sharing in a communication network. The method comprises determining a communication target from the load sharing vector generated according to the method for generating the load sharing vector, and forwarding a communication message towards the determined communication target.

According to an embodiment, the step of determining comprises determining an index value upon a basis of the communication message, in particular upon a basis of a header of the communication message, and selecting the active entry of the load sharing vector using the index value to determine the communication target. Alternatively, the index value may be provided by a message counter counting e.g. from 1 to M with an optional wrapping. By way of example, in particular in the case of in-sequence delivery of messages in a message flow, index value may preferably be the same for the messages in a given flow. According to an embodiment, the step of determining the index value comprises calculating a hash value from at least one message header entry of the header of the communication message.

According to an embodiment, the communication target is a communication route or a network node.

According to a further aspect, the invention relates to a communication node for generating a load sharing vector comprising a plurality of communication targets for load sharing in a communication network. The communication node comprises a processor which is configured to provide a target distribution vector comprising a first number of entries assigned to a first communication target, and comprising a second number of entries assigned to a second communication target, and to generate the load sharing vector upon the basis of active entries of the target distribution vector, the active entries indicating the communication target of the first or the second communication target which is available for load sharing in the communication network.

According to an embodiment, the processor is further configured to determine a communication target from the load sharing vector, and wherein the communication node further comprises a forwarder for forwarding the communication message towards the determined communication target.

According to an embodiment, the processor is configured to determine an index value upon a basis of the communication message, in particular upon a basis of a header of the communication message, and to select the active entry from the load sharing vector using the index value to determine the communication target.

The communication node may be one of: a router, a Signaling Gateway (SGW), a Media Gateway (MGW), a Packet Data Network Gateway (PGW), a MME (Mobility Management Entity), a MSC (Mobile Switching Center), a SGSN (Serving GPRS Support Entity), or a MGCF (Media Gateway Control Function), or a Signaling Transfer Point (STP), or a IP Signaling Transfer point IP-STP.

BRIEF DESCRIPTION OF THE DRAWINGS

Further embodiments may be described with reference to the following figures, in which.

DETAILED DESCRIPTION

Figure 1:
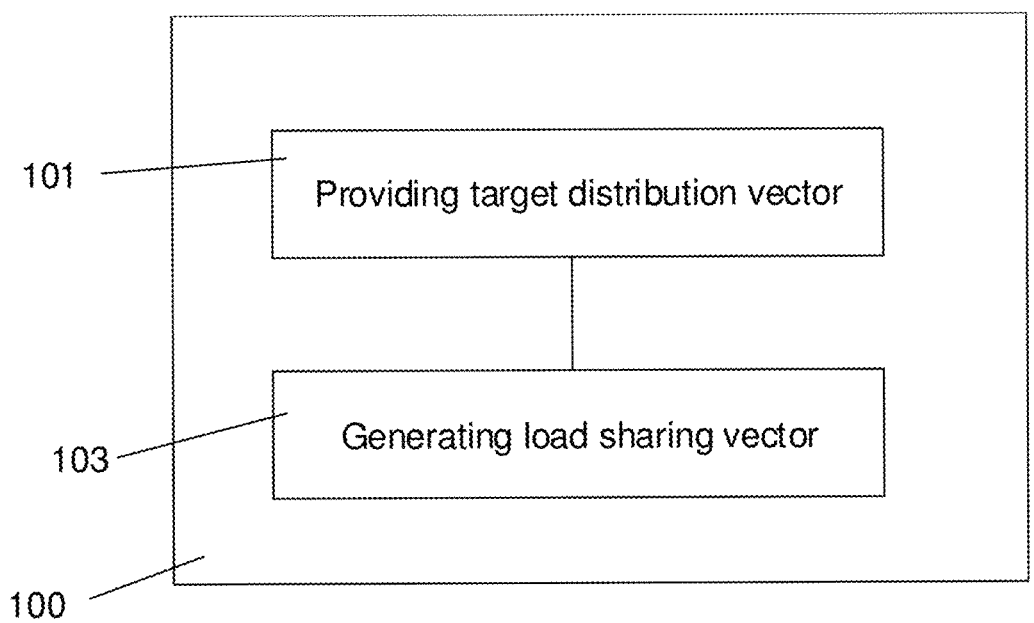
FIG. 1 shows a diagram of a method for generating a load sharing vector according to an embodiment.

FIG. 1 shows a diagram of a method 100 for generating a load sharing vector indicating a plurality of communication targets for load sharing in a communication network. The method may comprise providing 101 a target distribution vector comprising a first number of entries indicating a first communication target, and comprising a second number of entries indicating a second communication target, and generating 103 the load sharing vector upon the basis of active entries of the target distribution vector, the active entries indicating the communication target of the first or the second communication target which is available for load sharing in the communication network.

Figure 2:
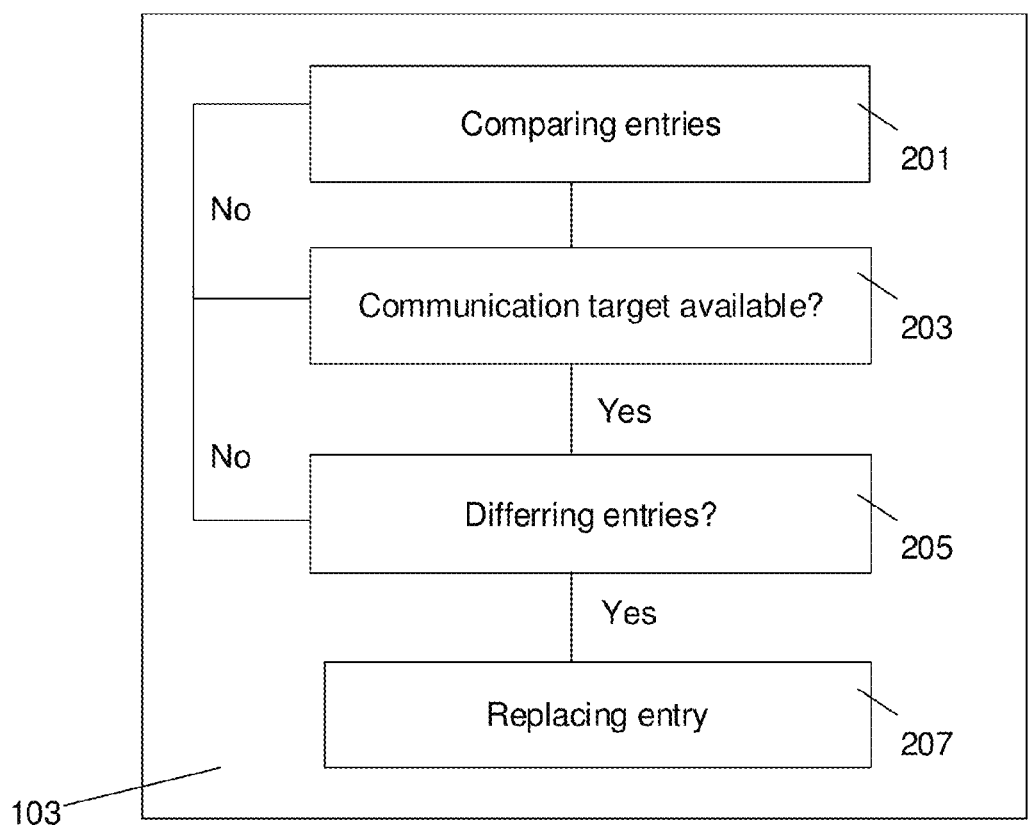
FIG. 2 demonstrates the step of generating the load sharing vector according to an embodiment.

FIG. 2 shows a diagram illustrating the step of generating 103 the load sharing vector upon the basis of active entries of the target distribution vector. The step of generating 103 the load sharing vector may comprise comparing 201 an entry of the load sharing vector with an entry of the target distribution vector, if the entry of the target distribution vector indicates a communication target which is available for load sharing, step 203, and if the entry of the target distribution vector differs from the entry of the load sharing vector, step 205, replacing 207 the entry of the load sharing vector by the entry of the target distribution vector to obtain an active entry in the load sharing vector, or if the entry of the target distribution vector indicates a communication target which is not available for load sharing, comparing 201 the entry of load sharing vector with a further entry, in particular with a subsequent entry, of the target distribution vector. Further embodiments relating to generating the load sharing vector may be described with reference to FIG. 9.

Figure 3:
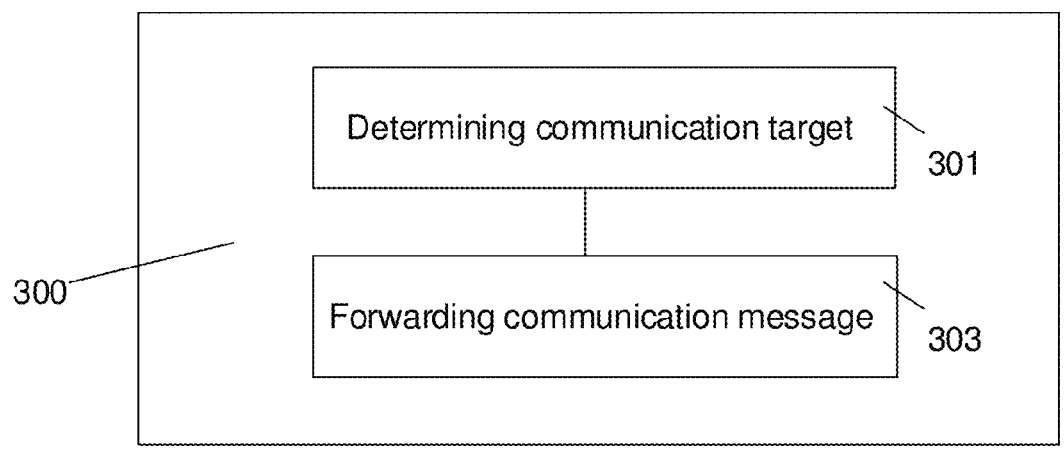
FIG. 3 shows a diagram of a method for load sharing according to an embodiment.

FIG. 3 shows a diagram of a method 300 for load sharing in a communication network. The method comprises determining 301 a communication target from the load sharing vector generated according to the method for generating the load sharing vector as shown e.g. in FIGS. 1 and 2, and forwarding 303 a communication message towards the determined communication target. The method may be executed e.g. by a router or by any network node which is capable of load sharing in a communication network. Further embodiments relating to load sharing may be described with reference to FIG. 10.

Figure 4:
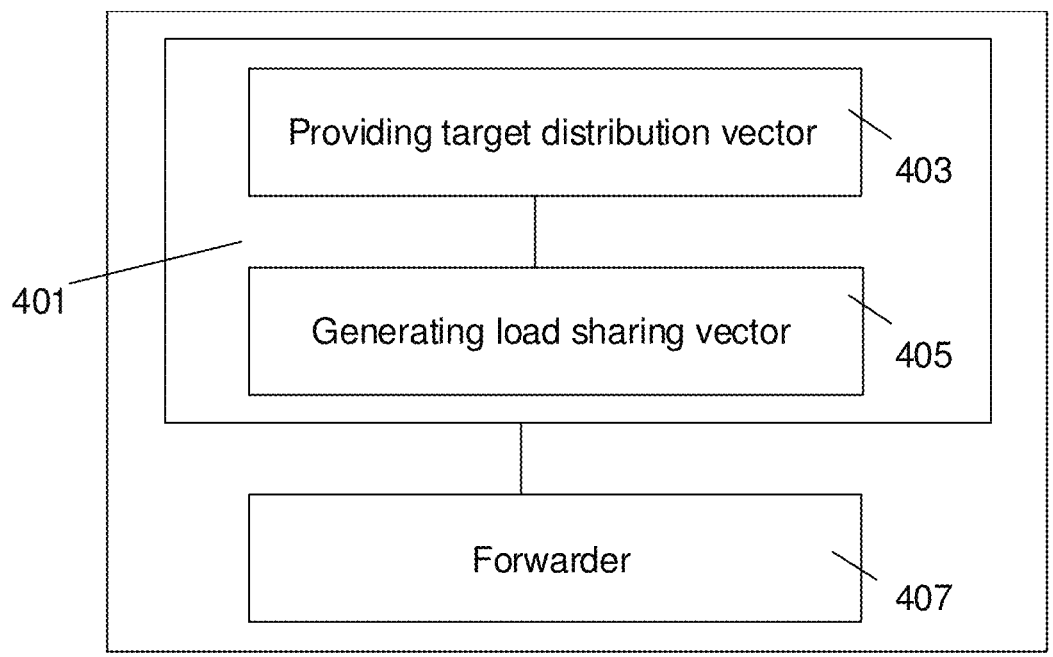
FIG. 4 shows a block diagram of a communication node according to an embodiment.

FIG. 4 shows a block diagram of a communication node 400 for generating a load sharing vector according to the principles described herein. The communication 400 comprises a plurality of communication targets for load sharing in a communication network, the communication node comprising a processor 401 which is configured to provide 403 a target distribution vector comprising a first number of entries assigned to a first communication target, and comprising a second number of entries assigned to a second communication target, and to generate 405 the load sharing vector upon the basis of active entries of the target distribution vector, the active entries indicating the communication target of the first or the second communication target which is available for load sharing in the communication network. The communication node 400 may further comprise a forwarder 407, e.g. a transmitter, for forwarding, e.g. transmitting, the communication message towards the determined communication target.

Figure 5:
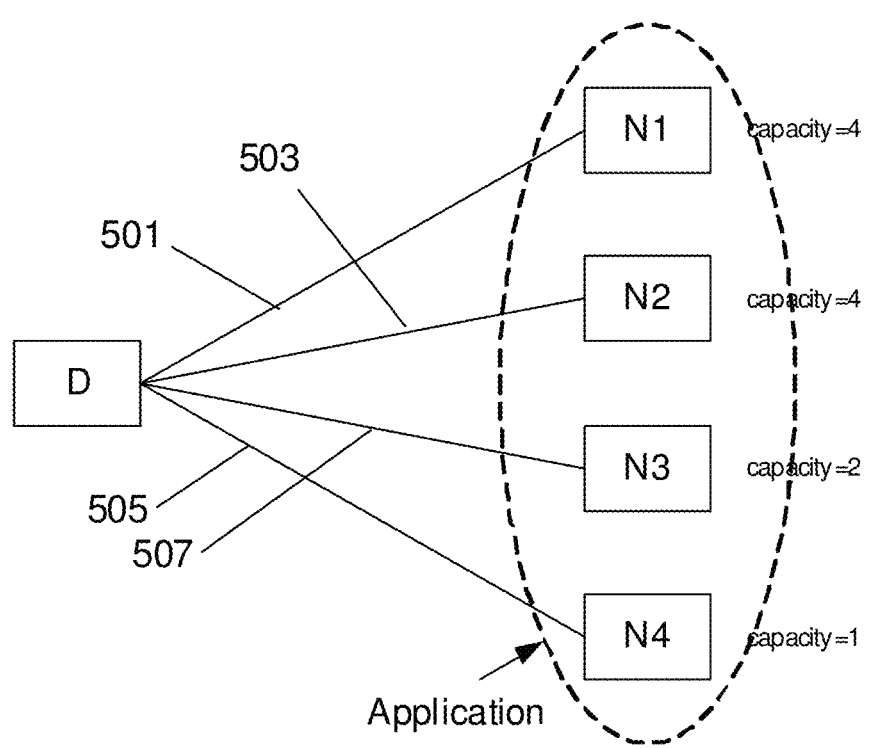
FIG. 5 shows a communication system according to an embodiment.

FIG. 5 shows a communication system comprising a communication node D being capable of sharing traffic for an application distributed on a number of network nodes N1, N2, N3 and N4 which may have different capacities. The traffic may be distributed towards the network nodes N1 to N4 via communication paths 501, 503, 505 and 507. The communication node D may be e.g. configured to determine the load sharing vector according to the principles described herein, and to distribute the traffic with communication messages accordingly. In order to determine the load sharing vector, the communication node D, forming an embodiment of a network distribution or communication node, may generate a target distribution vector comprising entries associated with the network nodes N1 to N4, which form embodiments of communication targets. The number of entries associated to each of the network nodes N1 to N4 may be determined by the respective capacity and may be different due to different capacities of the network nodes N1 to N4. Thus, the target distribution vector may provide information indicating network nodes which may perform the desired application without indicating the availability of the respective network node. Upon the basis of the target distribution vector, the communication node D may generate the load sharing vector indicating those of the network nodes N1 to N4 which are available for performing the desired application. Thereby, the availability of the network nodes N1 to N4 for load sharing may be determined.

Figure 6:
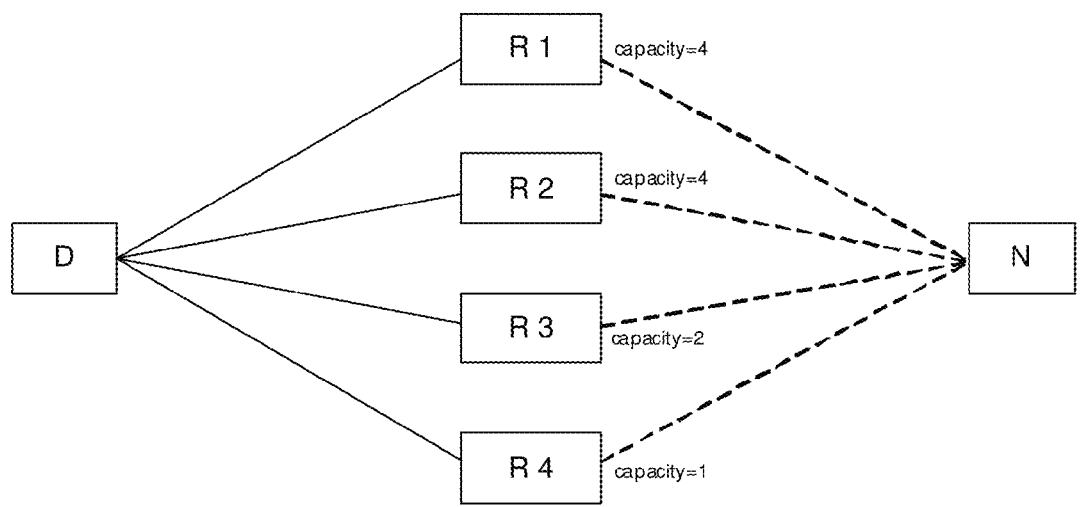
FIG. 6 shows a communication system according to an embodiment.

FIG. 6 shows an embodiment of a communication system with a communication node D is capable of load sharing of traffic to a network node N over a number of signaling routes R1, R2, R3 and R4 with different capacities, as indicated in FIG. 6. The communication node D may or may not correspond to the communication node D of FIG. 5. For load sharing, the communication node D may determine the load sharing vector having as communication targets active signaling routes according to the principles described herein. In this regard, the active signaling routes may be determined by communication links towards the network node N which are available for signal transmission. The availability information relating to the signaling routes R1, R2, R3, R4 may originate from a router or may be determined upon the basis of a routing table.

The communication nodes D depicted in FIGS. 5 and 6 may be e.g. SGWs (Signaling Gateway), or SGP (Signaling Process) nodes, or MSCs (MSC: Mobile Switching Center), or MSC-S BCs Correspondingly, the network nodes N1 to N4 and N may be SPX nodes (SPX: Signaling Proxy) which may, according to the embodiment of FIG. 5, balance the incoming SS7 and M3UA traffic over e.g. 64 MSC blades with differing processing capacities. The network nodes D may further be MSCs or SEPs (Signaling End Point).

By way of example, in the case of the MSC-S Blade Cluster node, the load sharing node D shown in FIG. 5 may be the SPX of e.g. two SPXs, running in parallel using the same load sharing algorithm, and the nodes N1 to N64 may the MSC blades.

With reference to FIG. 6, according to some embodiments, any AXE-based SGW node, e.g. including a SPX, may be configured to load share traffic to a destination over e.g. up to 64 routes.

According to the embodiments shown in FIGS. 5 and 6, e.g. a capacity-weighted load sharing may be performed. The communication node D may distribute outgoing messages to the receiving network nodes N1, . . . , Nm or through the routes R1, . . . , Rm according to their capacity. The capacity of the communication targets such as the receiving network nodes or signaling routes may, however, vary. Nevertheless, it is also possible to support communication targets whose capacity differs by at least an order of magnitude. The number m of communication targets may be large, e.g. up to hundreds of communication targets. In case some communication targets are not available for load sharing, the traffic may still be load shared according to the capacities of the remaining available communication targets. Furthermore, a consistent load sharing of message flows may be achieved according to some embodiments. With reference to FIGS. 5 and 6, the communication node D may also be able to forward all messages pertaining to a specific message flow to the same communication target.

In order to describe the load sharing approach in detail, the following assumptions may exemplarily be assumed: The number of message flows to be load shared may be large compared to a number m of communication targets. This may be the case when message flows such as calls or transactions are created dynamically and short-lived.

According to some embodiments, it is possible to discriminate a large number of message flows based on inspection of the transport protocol header and e.g. a few additional application-specific user protocol parameters that may be extracted on the communication node performing load sharing.

Thus, there may exists an application-specific function h that maps the e.g. extended message header into the integers $\{1, \ldots, N\}$, where $h(M1)=h(M2)$ for any pair of messages belonging to the same message flow and $N \gg m$. By way of example, the application-specific function h may map at least one the parameter of the message header into one or more hash values. Furthermore, the value of h may or may not be unique for each message flow.

According to some embodiments, e.g. a minimum portion of traffic in case of re-routing may be affected. In the event of a temporary failure of a communication target, messages that may have been distributed to the unavailable communication target may be re-routed to other, available communication targets. The purpose of re-routing may thus be manifold. In particular, every new message flow may always be handled. With reference to FIG. 5, in order to enable the new communication target to handle subsequent messages of an existing message flow, e.g. the processing of the message flow, if feasible, may be continued, or the first such message may be rejected to abort the message flow to the remote peer, which may speed up a recovery process. Further, according to some embodiments, only affected messages flows may be subject to re-routing since re-routing of other message flows may negatively impact more traffic than necessary as the new receivers may typically not handle the ongoing message flows successfully.

With reference to FIG. 6, it may be ensured that messages are forwarded to the destination node N as long as at least one route is available. During re-routing, e.g. in-sequence delivery of messages in a message flow may preferably be ensured. Messages routed according to the new load sharing vector may not be delivered before messages forwarded prior to re-routing.

In addition, a communication node redundancy may be achieved. It may also be possible to deploy two or more redundant load sharing nodes. Provided that the up-stream network on the left-hand side of the nodes D as shown n FIGS. 5 and 6 may re-route messages to a redundant communication node D, wherein ongoing message flows may not be affected when one communication node D fails. This may imply that redundant load sharing nodes are able to load share message flows in the same manner at all times so that, in the event of failure of one communication node D, the redundant node(s) may seamlessly take over the distribution without changing the distribution pattern defined e.g. in the respective load distribution vector.

In the following, the communication targets are denoted by (T1, . . . , Tm), the receiving network nodes are denoted by (N1, . . . , Nm), and the routes are denoted by (R1, . . . , Rm). Furthermore, for a distributed application, e.g. AS, as shown e.g. in FIG. 5 or destination communication node N as shown in FIG. 6, two vectors are deployed:

The target distribution vector (TDV) comprises entries determining a distribution pattern for the configured communication targets. Each communication target appears in the TDV with a relative frequency according to its capacity. The load distribution vector (LDV) may be derived from the target distribution vector and may take the availability of communication targets into account. The load distribution vector may be used for load sharing.

Furthermore, a translation function h may be introduced to map the e.g. extended header information of each received message to an index into the load distribution vector. When in-sequence delivery is required, h may map all messages in a message flow to the same index. The message may be forwarded to the communication target pointed to be the load sharing vector entry.

Each communication target T1, . . . , Tm may be associated with an integer capacity weight wi. The capacity weight is a property that is configured per communication target. Alternatively, it may be determined automatically, e.g. through measurements, or provided by an external party at run-time. Furthermore, each communication target T1, . . . , Tm may be associated with an integer capacity weight wi. The capacity weight may be a property that may be configured per communication target. Alternatively it may be determined automatically, e.g. through measurements, or provided by an external party at run-time. Each communication target may be, in its available state, available for load sharing, and in its unavailable state not available for load sharing.

Figure 7:
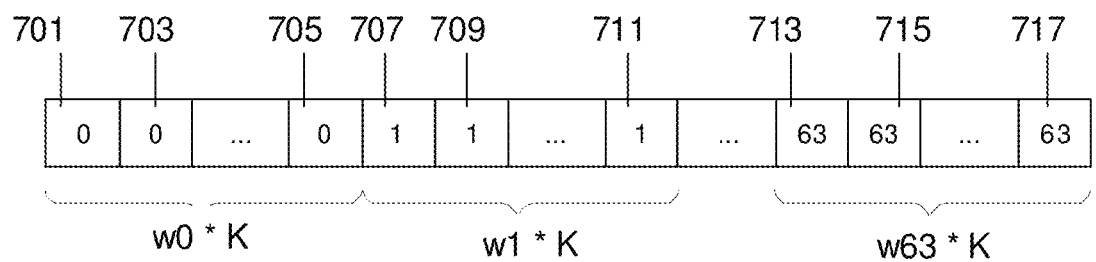
FIG. 7 shows a target distribution vector according to an embodiment.

By way of example, FIG. 7 shows an embodiment of a target distribution vector with e.g. 64 entry groups associated with e.g. 64 communication targets. By way of example, the target distribution vector may comprise the entries 701, 703 and 705 associated with a first communication target, the entries 707, 709 and 711 associated with a second communication target and the entries 713, 715 and 717 associated with a 64 communication target. Generally, the target distribution vector may be a vector with M elements, e.g. M=1024. The target distribution vector may be a vector with M elements (e.g. M=1024) in which each communication target Ti occurs with an approximate number M*wj/wtot times, where wj is capacity of communication target Ti and wtot is sum of the capacity of all communication targets.

Every communication target with capacity wj>0 may have at least one entry in the TDV. For example, if there are 64 communication targets with a total weight wtot=128 and M=1024 is an integer multiple of wtot, each communication target Ti may have wi*K entries, where K is equal to:

$$K = \frac{M}{w_{tot}} = 8$$

By way of example, if the capacity w0 for communication target T0 equals to 3, then T0 may have 24 entries in the vector TDV.

In the case where M is not an integer multiple of wtot, the allocation of TDV entries to communication targets may, for example, be performed according to the so-called largest remainder method using the Hare quota wtot/M. In order to guarantee at least one entry per communication target, all communication targets with zero integer and non-zero remainder may receive an entry and may be removed from the list, before the remaining entries are allocated to the other communication targets according to the size of their remainder.

If there are not enough remaining entries to provide at least one entry per communication target, the communication targets with the smallest weights may be allocated one entry each and the largest remainder method may be applied for the remaining communication targets only.

By way of example, FIG. 7 illustrates the frequency of communication targets in the TDV. However, the communication target entries may appear in random order in the TDV. This property may enable maintaining the capacity-weighted load sharing property at re-routing as described in the following. For randomization of the TDV, any suitable form of pseudo-random number generator may be used.

According to some embodiments, a communication target may be inserted into the TDV when it is defined and may be removed from TDV when it is undefined. These two actions and any change of capacity for a defined communication target may cause re-routing as the TDV and LDV have to be re-calculated.

If an in-sequence-delivery according e.g. to the embodiment of FIG. 6 is required, then a re-calculation of the TDV may lead to buffering of the complete traffic to the destination.

According to some embodiments, the LDV may be vector of communication targets with the same number of entries as the TDV. The entries of the LDV are derived from the TDV by taking the availability of communication targets into account. At any time the LDV only contain communication targets that are available.

By way of example, each entry in the LDV may have the following states:
  Forwarding, when the traffic including communication messages is being forwarded to the communication target; and
  a. Buffering, if the traffic including communication messages is temporarily buffered.

The LDV may be updated each time when the availability of a communication target changes or when the TDV is re-calculated. Whenever a LDV entry changes, its communication target may enter the buffering state to ensure in-sequence delivery of messages in a message flow. A re-routing timer per LDV entry may be started to control the re-routing procedure. Each LDV entry may maintain its own FIFO buffer in the buffering state. According e.g. to the embodiment of FIG. 5, in case there is no problem with out-of sequence delivery of messages in a message flow at re-routing, the buffering step may not be needed and may be skipped.

In order to generate a new or an updated LDV e.g. whenever a new target distribution vector has been calculated, the following scheme may be performed: For each index j in the range 1, . . . , M:
If the communication target of TDV[j] is available, store the communication target into LDV[j]j.

If the communication target of TDV[j] is unavailable, scan the TDV linearly for the next entry whose communication target is in the available state. If the scan reaches the end of the TDV, continue at the start. Store the found communication target in the LDV[j].

Figure 8:
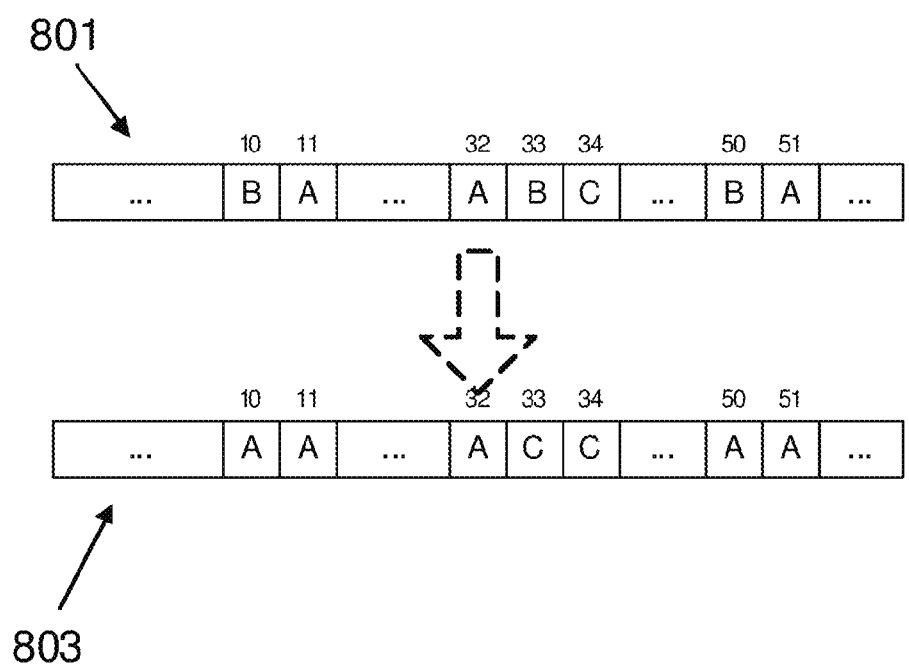
FIG. 8 demonstrates generating the load sharing vector upon the basis of the target distribution vector according to an embodiment.

FIG. 8 demonstrates the above described approach upon the basis of a target distribution vector 801 and a load sharing vector 803, wherein the indicator A denotes that a communication target is available, the indicator B denotes that a communication target is not available, and the indicator C denotes that a communication target is available. The target distribution vector may have a plurality of entries, among which e.g. entry 10 may be unavailable, entry 11 may be available, entry 32 may be available, entry 33 may unavailable, entry 34 may be available, entry 50 may be unavailable and entry 51 may be available. The indicators A, B and C may or may not be a part of the target distribution vector 801.

In order to generate the load sharing vector upon the basis of the target distribution vector, the target distribution vector may be searched for entries associated with available communication targets. Thus, only entries of the target distribution vector which are associated with available communication targets are stored into the load sharing vector 803. By way of example, starting with the entry 32, the entry 33 of the target distribution vector 801 is unavailable. Thus, the target distribution vector 801 is searched for next active entry associated with an available communication target so that, by way of example, the entry 34 of the target distribution vector 801 is copied at the index 33 of the load sharing vector. This iterative approach assures that the resulting load sharing vector has only active entries forming e.g. a subset of entries of the target distribution vector. However, if all communication targets are unavailable, then a valid load sharing vector may thus be created so that the application or a destination may be considered as been unavailable which results in a traffic which may be dropped.

When a communication target changes its state to the unavailable state, then all LDV entries pointing to this communication target may be affected and may be changed to other available communication targets as follows:

Change the state of an affected entry LDV[j] to the buffering state and start re-routing timer for LDV entry;

If the state was already buffering, no action may be performed;

Scan the TDV linearly from entry j+1 onwards for the first communication target in the available state. If the scan reaches the end of the TDV continue at the start. Store the found available communication target in LDV[j].

In FIGS. 9a to 9d, embodiments of generating a load sharing vector 901 upon the basis of a target distribution vector 903 are demonstrated. Starting from FIG. 9a, if e.g. a communication target B associated with an entry no. 10 in the target distribution vector fails then the load sharing vector 901 may be correspondingly be updated. By way of example, the load sharing vector 901 of FIG. 9a has entries which correspond to those of the target distribution vector 903 as the load sharing vector 901 may have been generated in a previous iteration step. Thus, the state of the entries 10, 11, 12, 32, 33, 34, 50, 51 and 52 indicate that the corresponding communication targets are available for load sharing, e.g. for forwarding communication messages.

In order to update the load sharing vector 901, the target distribution vector is searched for e.g. a first alternative communication target which may be stored at a position in the load sharing vector, which is indicated by the index 10 and so forth. In result, the load sharing vector 901 is in a state which may be set to buffering for affected entries in order to keep e.g. an in sequence delivery. Thus, entry 10 may indicate buffering, entries 11 and 12 may indicate forwarding, entry 32 may indicate buffering, entries 33 and 34 may indicate forwarding, entry 50 may indicate buffering and entries 51 to 52 may indicate forwarding.

By way of example, at a further time instant, e.g. an available communication target indicated at positions 11, 32 and 51 of the target distribution vector may fail. Thus, the updating of the load sharing vector 901 may be correspondingly performed so that the entry state of the load sharing vector may be changed back to forwarding when a buffer is emptied after e.g. expiry of a re-routing timer. Thus, the entries 10 to 52 as shown in FIG. 9c may be associated with forwarding communication targets.

Figures 9A, 9B, 9C, 9D:
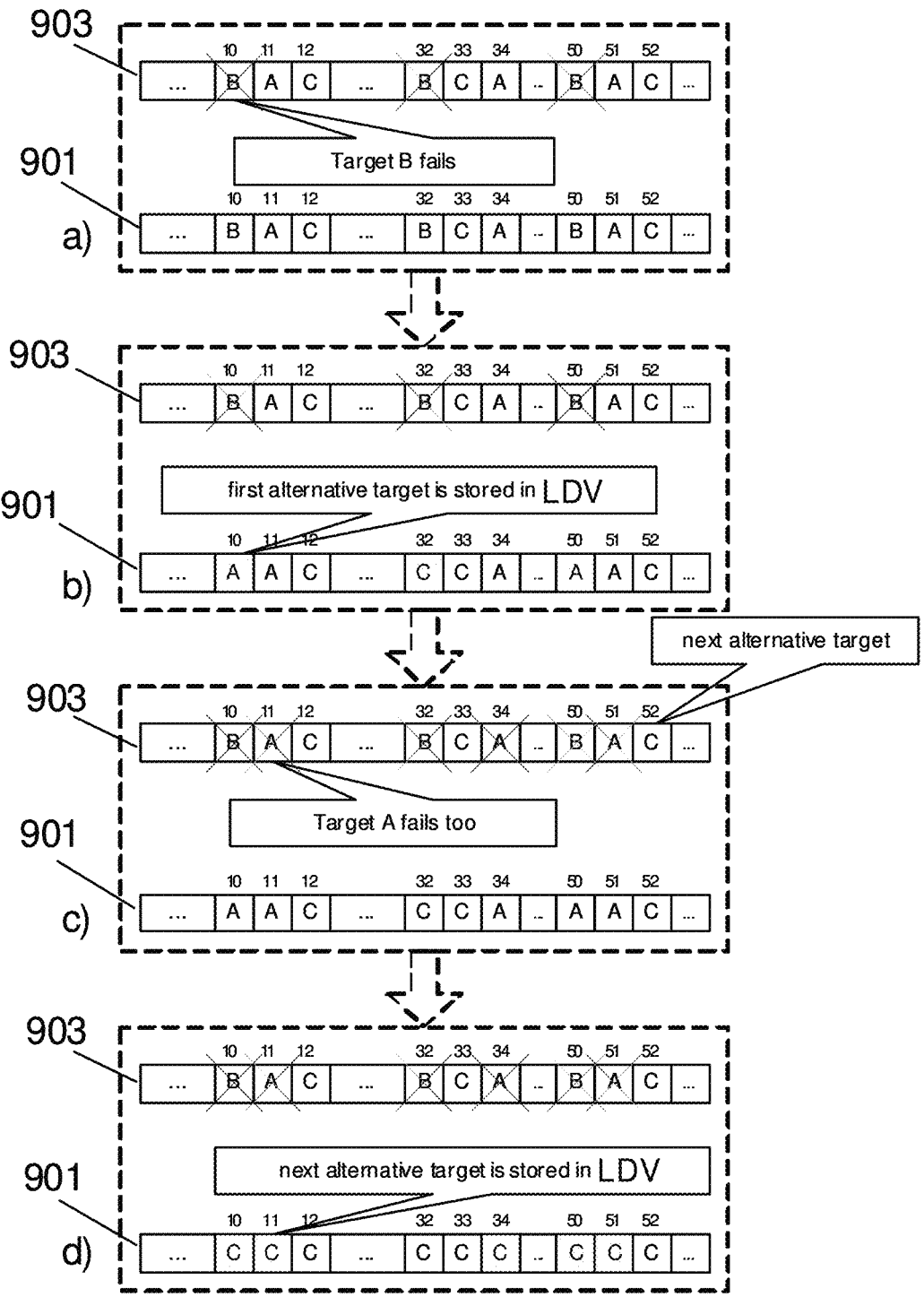
FIGS. 9a to 9g demonstrate generating the load sharing vector upon the basis of the target distribution vector according to some embodiments.

In order to update the load sharing vector, the procedure as shown in FIG. 9d may be performed, wherein the target distribution vector 903 is searched for active entries, i.e. entries which are associated with available communication targets, which are then copied into the load sharing vector 901. In result, by way of example, all entries of the load sharing vector 901 that use the affected communication target which is, according to the target distribution vector 903 of FIG. 9d not available, may be set to buffering. However, the entry state may be changed back to forwarding when e.g. a buffer is emptied after expiry of a re-routing timer. Thus, entries 10 and 11 may be associated with buffering, entries 12, 32 and 33 may be associated with forwarding, entries 34, 50 and 51 may be associated with buffering and entry 52 may be associated with forwarding.

Figures 9E, 9F, 9G:
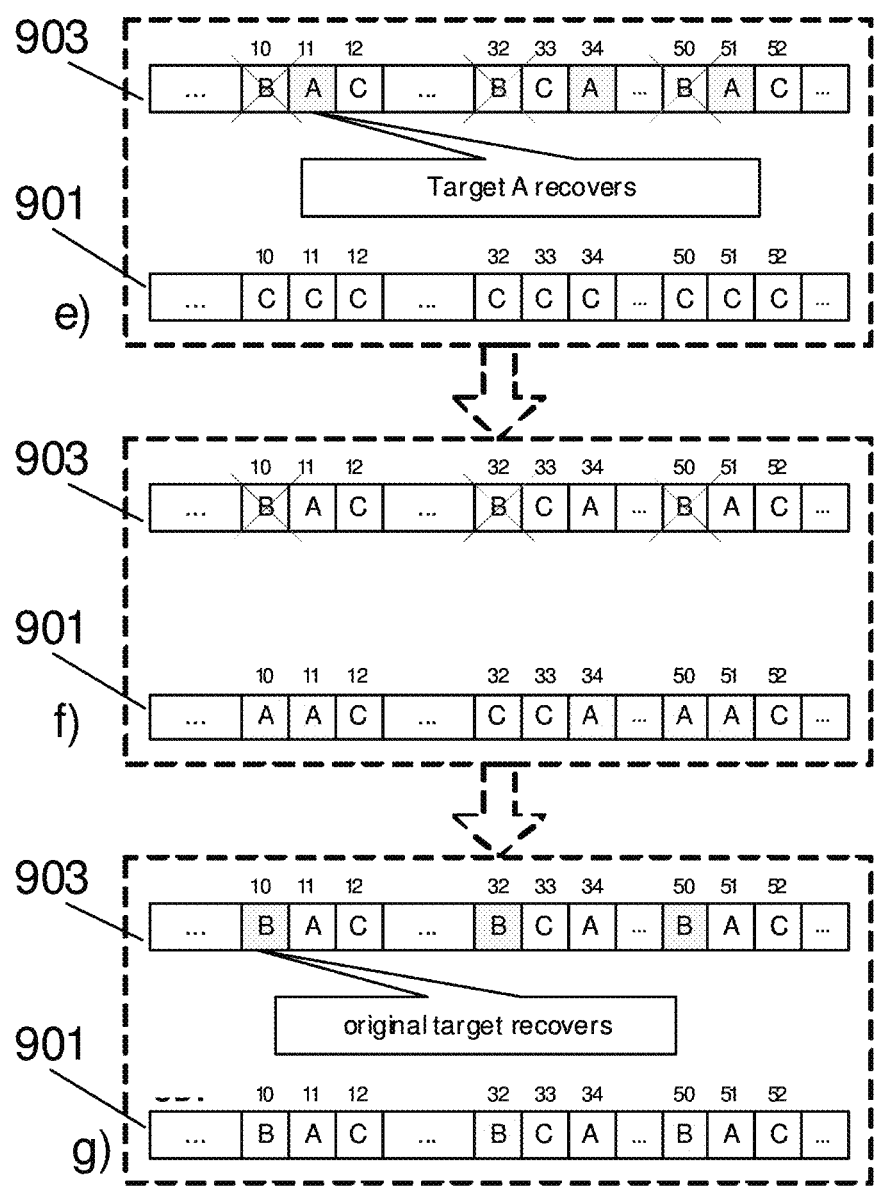

As shown in FIG. 9e, e.g. the communication target indicated at the positions 11, 32 and 51 of the target distribution vector 903 may recover and thus may become available. Thus, the state of the entries 10 to 52 may be set to forwarding in the load sharing vector 901. Correspondingly, the load sharing vector 901 may be updated as shown in FIG. 9f. By way of example, the state of each entry in the load sharing vector which is associated with a change of a communication target may be set to buffering. However, after an expiration of a re-routing timer, a buffer empty process may start. When the buffer is empty, the state of the entries of the load sharing vector may be changed to indicate forwarding. Thus, the entries 10, 34, 51 and 52 may indicate buffering and the entries 11, 12, 32, 33 and 50 may indicate forwarding. As shown in FIG. 9g, also the original communication target indicated by the entries at the positions 10, 32 and 50 of the target distribution vector 903 may recover. Therefore, the load sharing vector 901 may accordingly be updated. In this regard, the state of e.g. each entry in the load sharing vector 901 that is associated with a change of a communication target may be set to buffering. Thereafter, the re-routing timer may expire, so that the buffer empty process may begin. When the buffer is emptied, then the state of the entries of the load sharing vector may change back to forwarding. Thus, entries 10, 32 and 50 may be associated with buffering, wherein entries 11, 12, 33, 34, 51 and 52 may be associated with forwarding.

In summary, when a previously unavailable communication target recovers and becomes available, the LDV may be updated as follows:

For each index j in the range 1, . . . , M with LDV[j] unequal to TDV[j]:

Scan the TDV linearly from entry j onwards for the first communication target in the available state;

If the scan reaches the end of the TDV, then continue at the start;

If the found communication target is different from LDV[j] store it in CVD[j];

Set the state of CVD[j] to the buffering state and start the re-routing timer for the LDV entry. Otherwise stop iteration.

The LDV update described above is, by way of example, state-based in the sense that, given a certain availability of communication targets, the load sharing pattern may always be the same and may not depend on the history of availability changes in any way. This is the key enabler for redundant communication nodes that always apply the same load sharing pattern, as long as they have information on the same communication target states.

When a new communication target is selected for a LDV entry, a linear scan through the randomized TDV for the first available communication target may select communication targets pseudo-randomly according to their relative capacity weight among the remaining available communication targets. Through this approach, the relative frequency of available communication targets in the LDV may statistically adhere to the capacity distribution of the remaining available communication targets.

Figure 10:
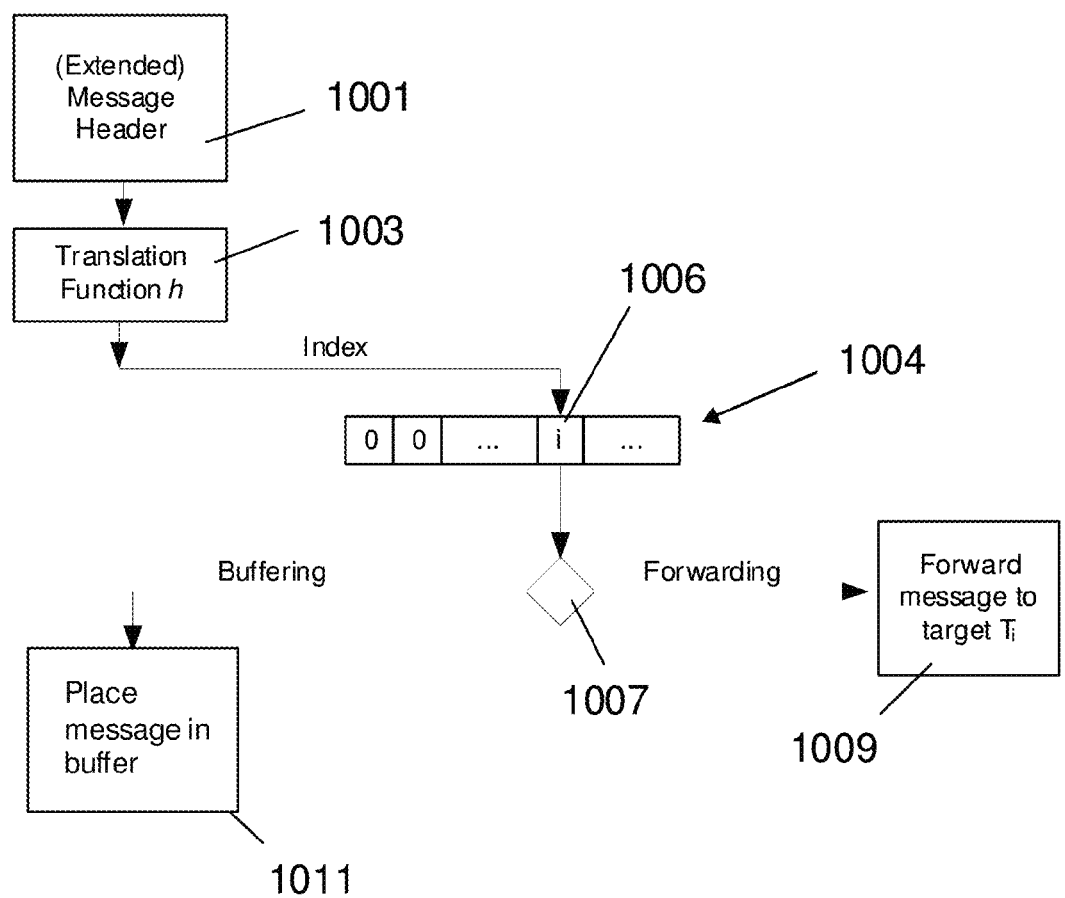
FIG. 10 shows a load sharing approach according to an embodiment.

FIG. 10 shows a diagram of a method for forwarding a communication message towards a communication target according to the load sharing principles described herein. In step 1001, input parameters for e.g. a translation function h are retrieved from the header of the communication message, e.g. from the extended message header. The input parameters may be at least one of: originating power point code (OPC), destination point code (DPC), network indicator (NI), service indicator (SI) and e.g. a circuit identification code (CIC) in case of an ISUP (ISDN user parts) message. In step 1003, the translation function h is deployed in order to generate an index indicating an entry of a load sharing vector 1004. The translation function h may be, by way of example, a hash function generation a hush value upon the basis of the input parameters, wherein the hush value forms an embodiment of the aforementioned index. However, the translation function h may be any function which maps at least one input parameter onto a value forming an index for the load sharing vector. In step 1006, the entry at the position of the load sharing vector which is indicated by the index provided by the translation function h is retrieved. In step 1007, a decision is made in dependence on an entry state of the load sharing vector 1004 as to whether to forward the communication message towards the communication target indicated by the retrieved entry, or as to whether to buffer the communication message. If the load sharing vector 1004 is not being updated, then, in step 1009, the communication message is forwarded towards the communication target Ti which is associated with the entry at the position i of the load sharing vector 1004. Conversely, if the load sharing vector 1004 is being updated, then, in step 1011, the communication message is buffered in an entry buffer, e.g. in an entry buffer of the load sharing vector 1004.

For the load sharing of message flows, the function h may map all messages of a given message flow to the same value i. This may be the case for any function if all messages in a flow have the same set of input parameters. In order to ensure good load sharing to all communication targets, the function h may produce output values in the entire range 1 . . . M or indices uniformly. Provided that the in-flow of messages has sufficient diversity in the input parameters, e.g. that the number of discernable message flows is large compared the number of communication targets, a hash function may be used for this purpose.

If there are no message flows, but if instead individual messages may be load shared independently, there may be no need for any translation function. An optimal load sharing may be achieved by simply stepping a round-robin counter in the range 1 . . . M for each received message and use the current counter value as output.

The output of the translation function may then be used as index into the LDV. If a LDV entry was selected in the forwarding state of the LDV, than the communication message may be forwarded directly to the communication target in the LDV entry. However, if the selected LDV was selected in the buffering state of the LDV, then the communication message may be placed at the end of the LDV entry buffer.

At expiration of re-routing timer for specific LDV entry, a parallel buffer emptying process may be started. This process may fetch messages from the head of the LDV buffer and forwards them to the communication target of the LDV entry. When the buffer is emptied, the process may stop and the state of the LDV entry may be set back to the forwarding state.

The load sharing approach described herein may, according to some implementations, be used for load sharing of message flows and individual messages without any load sharing constraints. Optionally, in-sequence delivery through buffering during re-routing may be provided. Additionally, re-routing at change of availability of a communication target may be performed.

According to some embodiments, only the affected message flows may be temporarily buffered. Other, unaffected message flows for the same application or destination need not be buffered. In addition, a reversal of re-routing may be achieved when communication targets become available again, e.g. when any communication node may come to the same LDV based on the current set of weights and communication target availabilities.

According to some embodiments, the deployment of redundant communication nodes which may seamlessly take over load sharing of message flows may be supported.

According to some embodiments, reduced internal resources may be used for buffering, so that an increased message lost ratio may be avoided.

According to some embodiments, a generic framework for the load sharing of signaling traffic with an application-specific handling of message flows and/or even distribution of all SLS values on each route. Thus, network-level load sharing over multiple relay stages as e.g. shown in FIG. 6 may efficiently be performed.

According to some embodiments, a capacity-weighted load sharing may be performed.

According to some embodiments, load sharing of message-flows or messages may be performed upon the basis of the principles described herein.

According to some embodiments, history-less, e.g. redundant, load sharing nodes can take over load sharing seamlessly.

According to some embodiments, a large number of load sharing targets, e.g. more than 16, may be taken into account.

What is claimed is:

1. A method, executed in a processor of a communication node, for distributing data traffic among a plurality of communication targets in a communication network for load sharing, the method comprising:
providing, by the processor, a target distribution vector comprising a number of entries per communication target, each entry indicating a capacity of a communication target, the target distribution vector determining a target distribution pattern for the plurality of communication targets, wherein providing the target distribution vector comprises determining the number of entries per communication target based on the following formula:

$$\frac{W_i \cdot M}{W_{tot}}$$

where $W_i$ denotes a capacity of the i-th communication target; M denotes a total number of entries in the target distribution vector; and $W_{tot}$ denotes a capacity of all communication targets indicated in the target distribution vector;
generating, by the processor, the load sharing vector based on active entries of the target distribution vector, the active entries each indicating a communication target which is available for load sharing in the communication network; and
distributing, by the processor, the data traffic among the plurality of communication targets according to the load sharing vector.

2. The method of claim 1, wherein the providing the target distribution vector comprises obtaining a randomized target distribution vector by one of:
randomly reordering entries in the target distribution vector;
randomly inserting entries into the target distribution vector.

3. The method of claim 1, where the providing a target distribution vector is executed when any of:
a communication target is defined and must be inserted;
a communication target is undefined and must be deleted;
a change in capacity of communication targets.

4. The method of claim 1, wherein the generating the load sharing vector comprises scanning the target distribution vector for entries associated with communication targets which are available for load sharing.

5. The method of claim 4, where the generating the load sharing vector further comprises:
setting a buffering state for each entry affected by a communication target becoming available or unavailable, in the load sharing vector;
setting a rerouting timer; and
setting a forwarding state for an entry affected by a communication target becoming available or unavailable in the load sharing vector, when the corresponding buffer is empty after expiry of the timer.

6. The method of claim 1, wherein the generating the load sharing vector comprises copying the entries indicating communication targets which are available for load sharing from the target distribution vector into the load sharing vector.

7. The method of claim 1, wherein the generating the load sharing vector comprises:
comparing entries of the load sharing vector with entries of the target distribution vector;
updating entries of the load sharing vector with entries of the target distribution vector which are associated with communication targets being available for load sharing to obtain the active entries in the load sharing vector.

8. The method of claim 1, wherein the generating the load sharing vector comprises:
comparing an entry of the load sharing vector with an entry of the target distribution vector;
at least one of:
replacing the entry of the load sharing vector by the entry of the target distribution vector to obtain an active entry in the load sharing vector if both of:
the entry of the target distribution vector indicates a communication target which is available for load sharing; and
if the entry of the target distribution vector differs from the entry of the load sharing vector;
comparing the entry of load sharing vector with a further subsequent entry of the target distribution vector if the entry of the target distribution vector indicates a communication target which is not available for load sharing.

9. The method of claim 1, wherein the generating the load sharing vector is executed each time the availability of a communication target changes or when the Target Distribution Vector is recalculated.

10. The method of claim 1, further comprising:
determining a communication target from the load sharing vector, and
forwarding a communication message towards the determined communication target.

11. The method of claim 10, wherein the determining comprises:
determining an index value based on a header of the communication message, or providing an index value by a message counter; and
selecting the active entry of the load sharing vector using the index value to determine the communication target.

12. The method of claim 11, wherein the determining the index value comprises calculating a hash value from at least one message header entry of the header of the communication message.

13. The method of claim 1, wherein the communication target is one of:
a communication route;
a communication path;
a network node;
an application distributed on a number of network nodes.

14. A communication node for distributing data traffic among a plurality of communication targets in a communication network for load sharing, the communication node comprising a processor and a memory coupled to the processor, the processor configured to:
provide a target distribution vector comprising a number of entries per communication target, each entry indicating a capacity of a communication target, the target distribution vector determining a target distribution pattern for the plurality of communication targets wherein the processor is configured to provide the target distribution vector by determining the number of entries per communication target based on the following formula:

$$\frac{W_i \cdot M}{W_{tot}}$$

where Wi denotes a capacity of the i-th communication target; M denotes a total number of entries in the target distribution vector; and Wtot denotes a capacity of all communication targets indicated in the target distribution vector;
generate the load sharing vector based on active entries of the target distribution vector, the active entries each indicating a communication target which is available for load sharing in the communication network; and
distribute the data traffic among the plurality of communication targets according to the load sharing vector.

15. The communication node of claim 14:
wherein the processor is further configured to determine a communication target from the load sharing vector;
wherein the communication node further comprises a forwarder configured to forward a communication message towards the determined communication target.

16. The communication node of claim 15, wherein the processor is further configured to:
determine an index value based on a header of the communication message, or provide an index value by a message counter;
select the active entry of the load sharing vector using the index value to determine the communication target.

17. The communication node of claim 16, wherein the processor is further configured to determine the index value by calculating a hash value from at least the header of the communication message.

18. The communication node of claim 14, wherein the processor is further configured to obtain a randomized target distribution vector by:
randomly reordering entries in the target distribution vector; or
randomly inserting entries into the target distribution vector.

19. A communication node according to claim 14:
wherein the processor is configured to provide the target distribution vector in response to any of:
a communication target is defined and must be inserted;
a communication target is undefined and must be deleted;
a change in capacity of communication targets;
wherein the processor is configured to generate the load sharing vector each time the availability of a communication target changes or when the target distribution vector is recalculated;

wherein the processor is configured to generate the load sharing vector by:
  scanning the target distribution vector for entries associated with communication targets which are available for load sharing;
  setting a buffering state for each entry affected by a communication target becoming available or unavailable, in the load sharing vector;
  setting a rerouting timer;
  setting a forwarding state for an entry affected by a communication target becoming available or unavailable in the load sharing vector, when the corresponding buffer is empty after expiry of the timer;
  copying the entries indicating communication targets which are available for load sharing from the target distribution vector into the load sharing vector;
  comparing entries of the load sharing vector with entries of the target distribution vector;
  updating entries of the load sharing vector with entries of the target distribution vector which are associated with communication targets being available for load sharing to obtain the active entries in the load sharing vector;
  replacing the entry of the load sharing vector by the entry of the target distribution vector to obtain an active entry in the load sharing vector if both of:
    the entry of the target distribution vector indicates a communication target which is available for load sharing; and
    if the entry of the target distribution vector differs from the entry of the load sharing vector;
  comparing the entry of the load sharing vector with a further subsequent entry of the target distribution vector if the entry of the target distribution vector indicates a communication target which is not available for load sharing.

* * * * *